May 17, 1960

N. I. PERRY 2,936,867

COMBINED ACCELERATOR AND FOOT BRAKE

Filed Feb. 17, 1959

Inventor
NELSON I. PERRY

Attys.

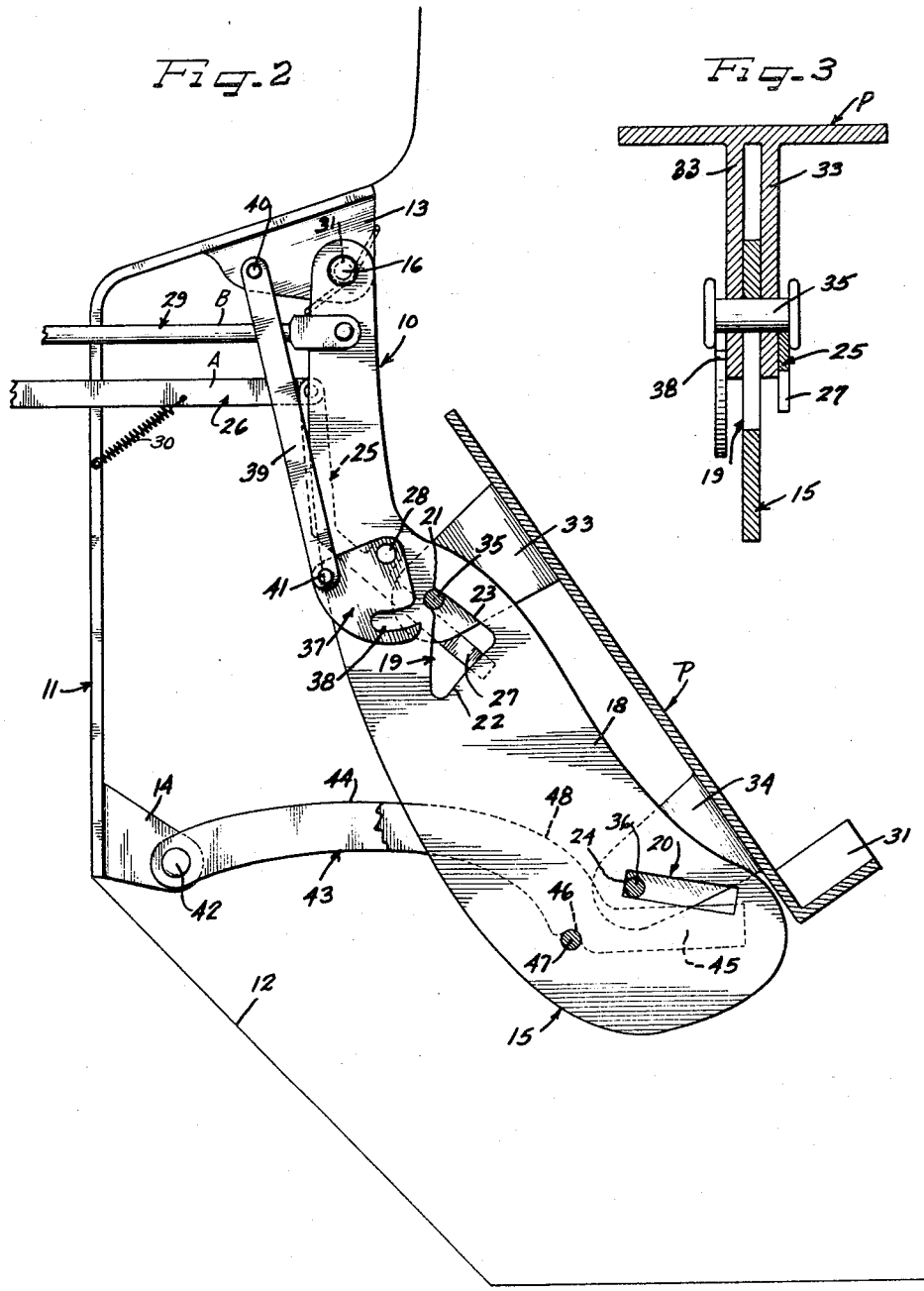

May 17, 1960 N. I. PERRY 2,936,867
COMBINED ACCELERATOR AND FOOT BRAKE
Filed Feb. 17, 1959 6 Sheets-Sheet 3
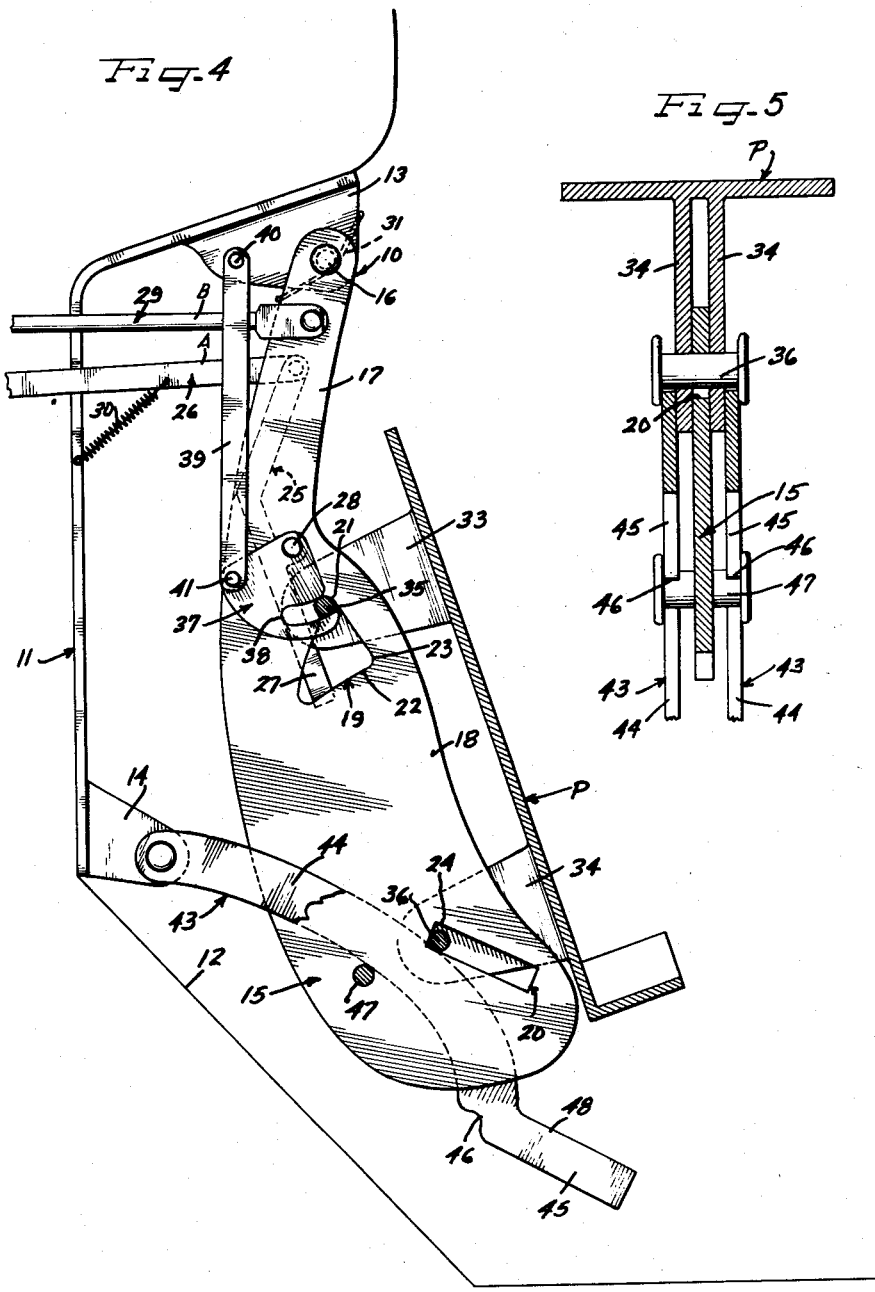
Inventor
NELSON I. PERRY

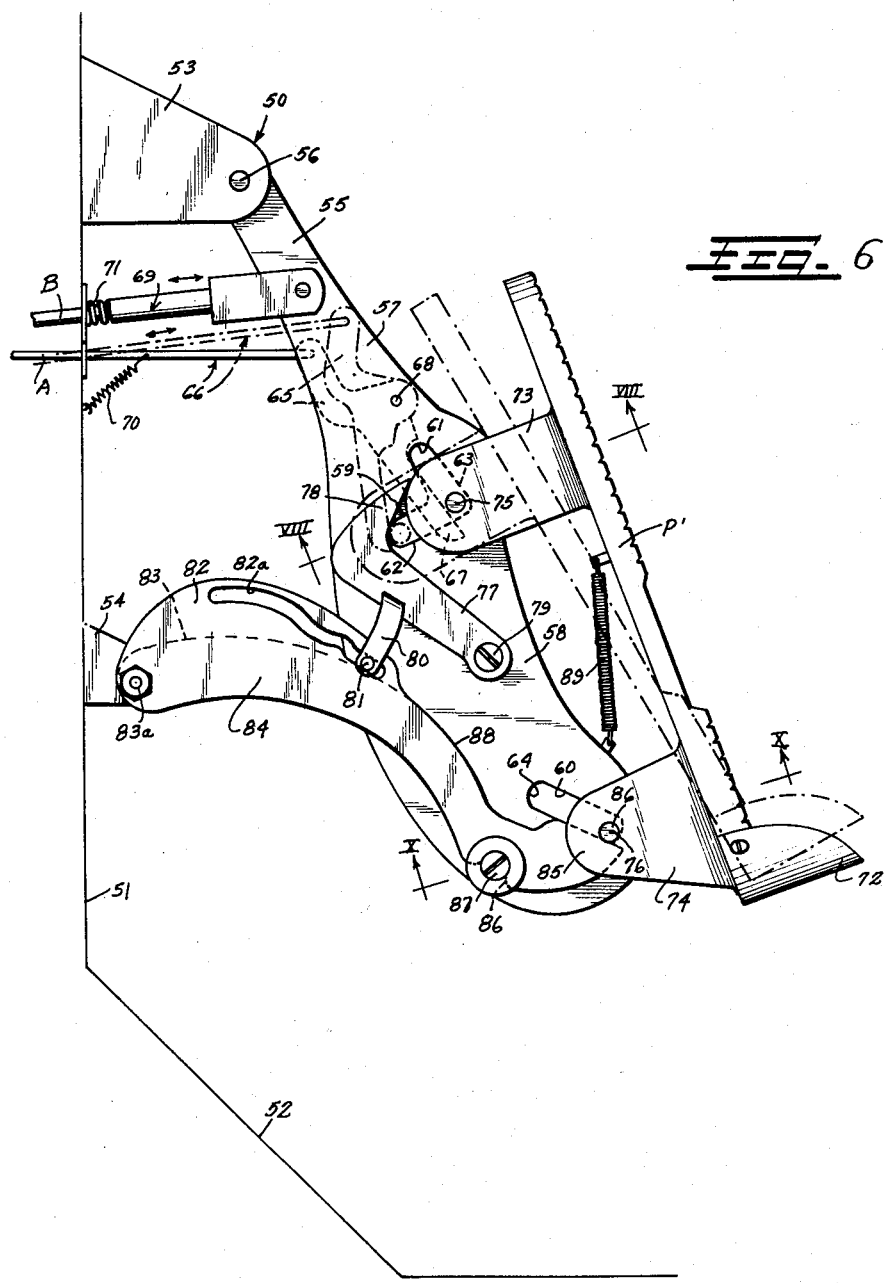

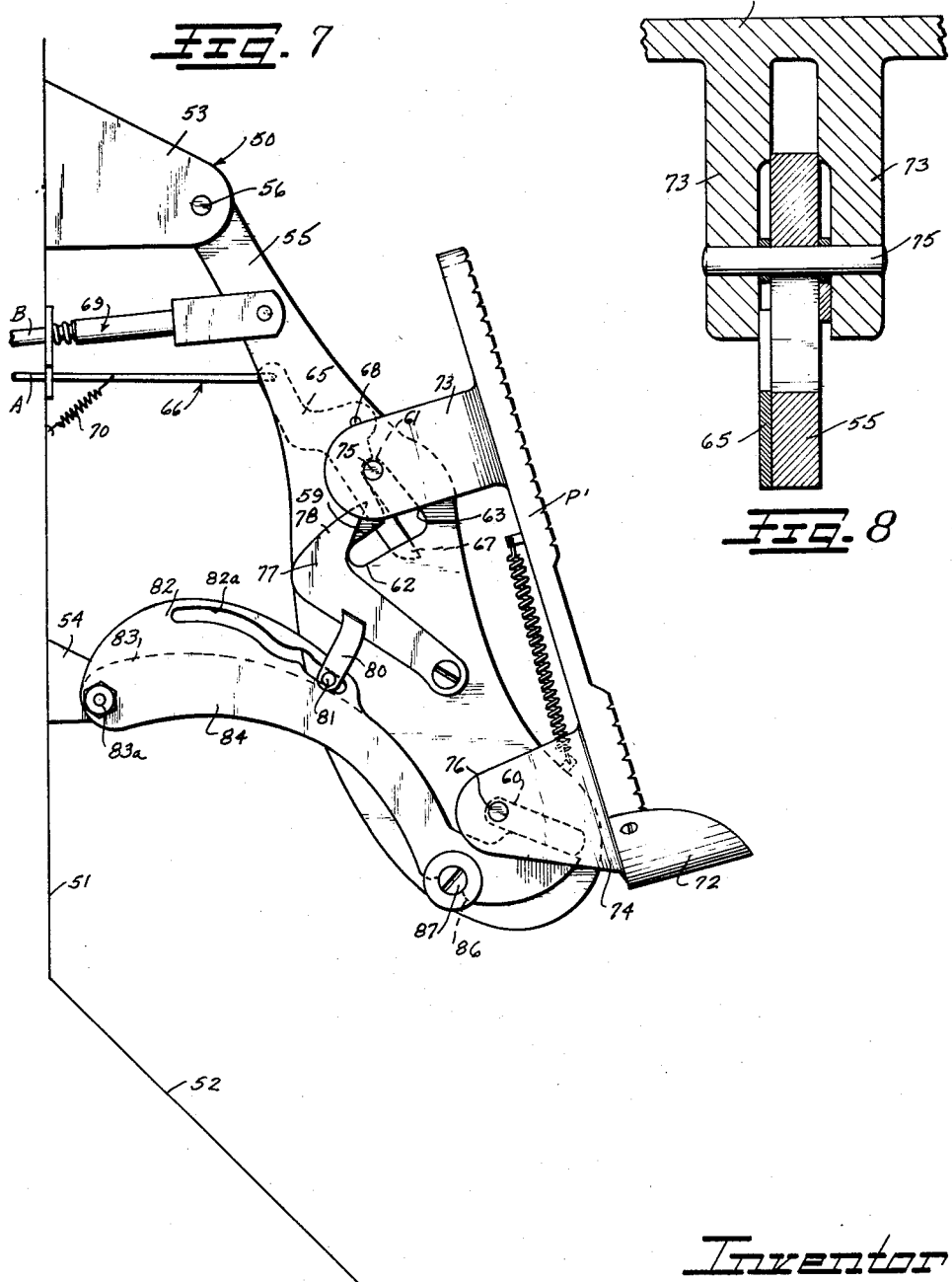

May 17, 1960  N. I. PERRY  2,936,867
COMBINED ACCELERATOR AND FOOT BRAKE
Filed Feb. 17, 1959  6 Sheets-Sheet 6
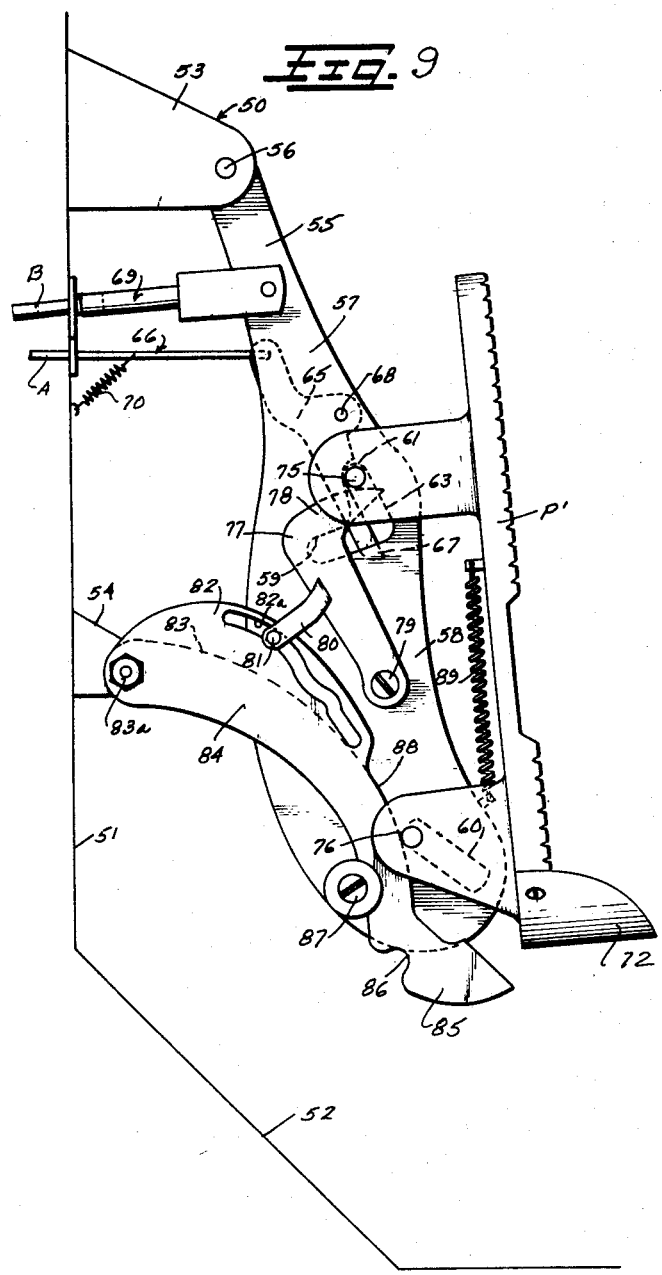
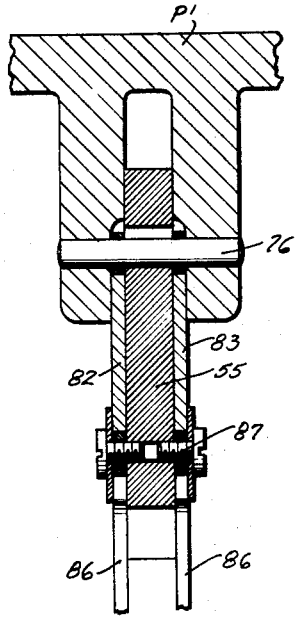
Inventor
Nelson I. Perry

United States Patent Office 2,936,867
Patented May 17, 1960

2,936,867

COMBINED ACCELERATOR AND FOOT BRAKE

Nelson I. Perry, Chicago, Ill.

Application February 17, 1959, Serial No. 793,927

9 Claims. (Cl. 192—3)

This invention relates generally to manually operable devices capable of selectively operating different controls. More specifically, this invention relates to foot controlled devices for use with an automotive vehicle or the like to selectively operate accelerator and braking controls and which reduces the time lag between accelerating and braking stages of operation as contrasted with commonly employed two pedal systems.

The instant invention relates generally to new and improved combination accelerating and braking mechanisms each including novel linkage for selectively operating the accelerating and braking controls through a single foot pedal.

Accordingly, an object of this invention is to provide new and improved foot operated devices each including a foot pedal to selectively operate accelerating and braking controls.

A further object of this invention is to provide new and improved types of a combined foot brake and accelerator which may be marketed as a replaceable unit and which lends itself to being attached to a floor board or panels adjacent a seat of an automobile or other power driven vehicles.

Yet another object of this invention is to provide new and improved types of a combined foot brake and accelerator device which are highly efficient in operation, which have a reduced number of parts, and which lend themselves to being economically manufactured on a large production basis.

According to the general features of the present invention there is provided foot controlled devices each including a foot pedal to selectively actuate separate accelerator and brake controls, a main braking plate connected to a supporting structure and maintained relatively stationary to the supporting member in a first stage of operation of the foot device when the accelerator control is actuated and swingable relative to the supporting structure in a second stage of operation of the foot device to actuate the brake control, a swingable bell crank lever fulcrumed on and swingable relative to the braking plate cooperable with the accelerator control to actuate the same during the first stage of operation of the foot device, the foot pedal being slidably carried by the main plate into a forward and a rearward position with respect thereto and with the slidable pedal being in the rearward position for operating the accelerator control and with the pedal being in the forward position for operating the brake control.

A further feature of the present invention relates to a lock out mechanism provided on each of the devices operable upon movement of the pedal into the forward position to positively prevent actuation of the bell crank lever during the operation of the brake control.

Still another feature of the invention relates to the provision of releasable means on the device to maintain the lower end of the pedal in a fixed position during the operation of the accelerator control and which is releasable during the operation of the braking control to allow the lower end of the pedal to move forward.

Other objects and features of the instant invention will more fully become apparent from the following description taken in conjunction with the accompanying drawings illustrating a single embodiment thereof and in which:

Figure 2 is a side view partly in elevation and partly in cross-section showing another stage of operation of my novel foot operated device just prior to a locking means locking out the foot pedal to prohibit operation of the accelerator control during the braking stage in the operation of the device;

Figure 3 is an enlarged cross-sectional view, partly in elevation, taken substantially on the line III—III on Figure 1 looking in the direction indicated by the arrows;

Figure 4 is a side view of my novel braking device similar to Figures 1 and 2 but showing the braking stage of the operation of my novel device;

Figure 5 is an enlarged fragmentary cross-sectional view, partly in elevation, taken substantially on the line V—V of Figure 1 looking in the direction indicated by the arrows;

Figure 6 is a side view partly in elevation and partly in cross-section showing in full and dotted lines a modified foot operated device with the foot pedal being shown in normal and accelerating positions, similar to Figure 1;

Figure 7 is a side view partly in elevation and partly in cross-section showing another stage of operation of the modified foot operated device just prior to a locking means locking out the foot pedal to prohibit the operation of the accelerator control during the braking stage in the operation of the device;

Figure 8 is an enlarged cross-sectional view, partly in elevation, taken substantially on the line VIII—VIII on Figure 6 looking in the direction indicated by the arrows;

Figure 9 is a side view of the modified braking device similar to Figures 6 and 7 but showing the braking stage of the operation of the modified device; and Figure 10 is an enlarged fragmentary cross-sectional view, partly in elevation, taken substantially on the line X—X in Figure 6 looking in the direction indicated by the arrows.

As shown on the drawings:

Figure 1:
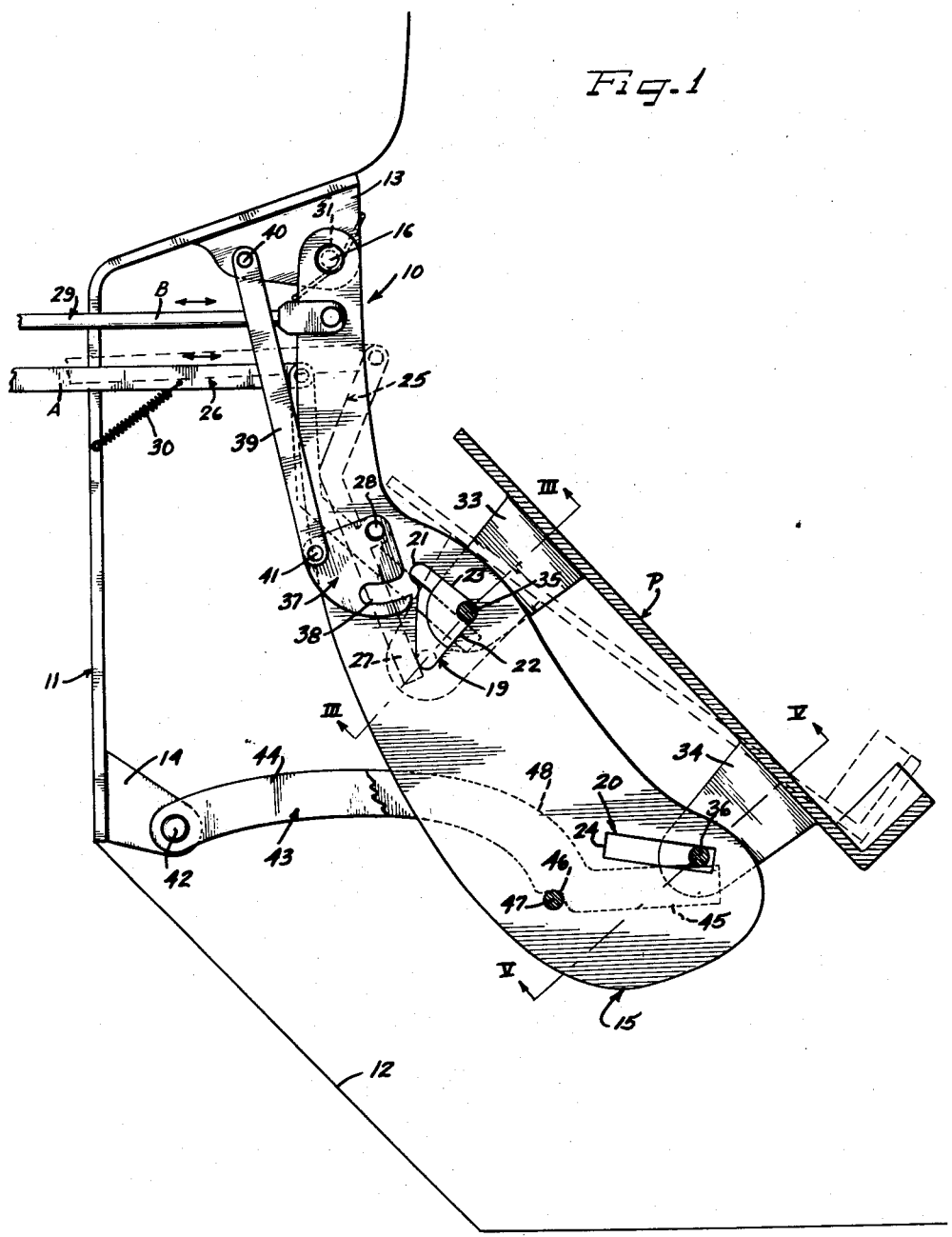
Figure 1 is a side view partly in elevation and partly in cross-section showing in full and dotted lines my novel foot operated device with the foot pedal being shown in normal and accelerating positions.

The reference numeral 10 indicates generally my novel combination foot brake and accelerator or foot controlled device as shown in Figures 1–5. This device 10 has an L-shaped bracket 11 which is adapted to be attached in any suitable manner to a floor board or panel 12 or other supporting structure adjacent the front seat of a vehicle. The instant device 10 may if desired be sold as a composite replaceable unit.

At opposite ends of the bracket 11 are provided depending lugs 13 and 14. Swingably carried upon lugs 13 is main brake plate 15 by means of a pin 16 extending therethrough. This brake plate 15 is somewhat of a paddle shaped configuration including neck and head portions 17 and 18 respectively. Disposed on the head portion 18 are two longitudinally spaced slots 19 and 20 respectively (Figure 4). Slot 19 is somewhat of a triangular configuration and has a notch-like seat 21 disposed therein. The slot 19 is defined by edges 22 and 23 which are significant for reasons subsequently developed (Figure 4). Slot 20 is more or less rectangular in shape and is defined by continuous rectangular edge 24 (Figure 4).

Fulcrumed and pivotally carried upon the brake plate 15 is a bell crank lever 25 which is connected at one end to an accelerator control extension or control A, 26 and has another and free end 27 which is disposed in proximity to slot 19. As is shown by the arrow in Figure 1 it will be noted that as the bell crank lever 25 is pivoted upon a pivot pin 28 through plate 15 it causes the extension 26 to move or reciprocate inwardly and outwardly with respect to the bracket 11. It will be appreciated that the accelerator control extension 26 is connected to a conventional throttle and carburator (not shown) which may be of the type shown in my earlier issued patent, No. 2,411,167.

Pivotally connected to the neck portion 17 of brake plate 15 is a brake control extension or control B, 29 which is movable back and forth as shown by the arrows much in the same manner as is the extension 26 to operate any suitable braking system by applying different forces to a bodily slidable pedal structure P. It will be appreciated that the instant device is adapted to have two main stages of operation depending on which control A and B is intended to be actuated, that is, either the accelerator extension 26 or the brake extension 29 may be actuated through the application of selective pressures by a foot of an operator to the single pedal P.

Normal position of the extensions 26 and 29 are shown in Figure 1 when the device 10 or more particularly the pedal P is free from any foot pressure or the like. Suitable springs 30 and 31 respectively are provided in order to maintain the extensions 26 and 29 in predetermined positions when the pedal P is free from foot pressure.

The pedal structure P may be made out of any suitable material although preferably of a substance which enables a good gripping action to be obtained when a foot is applied to the outer surface thereof. This pedal P also has a heel rest portion 32 to allow a foot to be maintained at all times in firm engagement with the pedal P.

The pedal structure P has formed on the underside thereof integral sets of longitudinally spaced lugs 33, 33 and 34, 34. It will be noted that each of the lugs in each set are spaced transversely relative to one another and are adapted to receive therebetween the brake plate 15. Pivot pins 35 and 36 each extend transversely through respective sets of lugs 33, 33 and 34, 34 and in so doing extend through the brake plate slots 19 and 20 to maintain the pedal structure P in assembly therewith.

Fulcrumed on the brake plate 15 by the same pivot pin 28 is a lock out plate 37 having a notch 38 therein which is in close adjacency to the seat 21 in the slot 19. A connecting arm 39 is connected at one end by a pivot pin 40 to lug 13 and at the other end by a pivot pin 41 to the lock out plate 37. By virtue of this construction as the main brake plate 15 swings on its axis or pin 16 the arm 39 may also swing in a somewhat similar manner in order to bring the notch 38 in proper alignment and engagement with the pivot pin 35 (Figure 4) when the pin 35 is lodged in the seat 21. It will be appreciated that when the lock out plate 37 is engaged with the pin 35 that the pin 35 is prohibited from actuating bell crank lever 25 and more specifically the free end 27.

Pivotally connected to lug 14 by a pin 42 are particularly constructed releasable lever arms 43, 43 each having an arcuate arm portion 44 immediately adjacent the pivot 42 and terminating in an angled terminal portion 45. These arms 43, 43 cooperate with the pedal P to provide a releasable back up stop means therefor in cooperation with certain other components as will be hereafter further described. Provided at the junction of the arcuate arm portion 44 and terminal portion 45 on the underside thereof is a notch or seat 46 which serves a function hereinafter described in further detail.

Carried on the main brake plate 15 is a pivot pin 47 which is adapted in one stage of the operation of my device 10 to engage in the seats 46 of the arms 43 to provide a backed up stop. When acting as a stop, the pivot pin 36 is engaged against the free ends of terminal arm portions 45 to enable the pedal P to rotate on pin 36 (as is shown in Figure 1 by the dotted and full lines) to move the forward portion of the pedal up and down to actuate accelerator extension 26.

In the other stage of operation, when the pedal P is moved bodily upward or forward with the respective pins 35 and 36 moving into forward positions in the respective slots 19 and 20 the pivot pin 47 is caused to disengage from seats 46 (Figures 4 and 5). During this stage of operation the pivot pin 36 slidably moves forward along top edges 48 of portions 44 and 45 of arms 43 until the pin 36 reaches the forward edge 24 of slot 20. At this time the pressure exerted by the foot against the pedal causes the main brake plate 15 to swing and actuate brake control extension 29 or control A.

*Operation*

By virtue of employing springs 30 and 31 when the pedal P is free from pressure the various components of my device 10 will automatically be returned to a predetermined normal position as is indicated by the full line disclosure in Figure 1.

When the device 10 and particularly the pedal P is in a normal position it will be noted that the pivot 36 bears against arm portions 45 (Figure 5) of the back up or support levers 43 and that the pin 47 is seated in seats 46 in backed up relation.

By applying pressure with the toe portion of the foot against the pedal it is caused to pivot and swing from the pivot 36 to actuate extension 26 or control A. As is shown in Figure 1, in dotted lines, the free end 27 of the bell crank lever 25 normally rests against the pin 35. Thus, when pressure is applied to the forward or upper portion of the pedal it causes the pin 35 to bear against the free end 27 which fulcrums at 28 and causes the accelerator control extension 26 to be actuated. As the pin 35 moves in the slot during acceleration it is guided along slot edge 22.

To brake my device 10 the pedal structure P must be moved bodily forward on its pivots 35 and 36 in slots 19 and 20 along their respective edges 23 and 24 until pivot 35 is lodged in seat 21 (Figure 2) and at which time pivot 36 is moved into a forward position in slot 20. It should be noted that this entire movement of the pedal structure P may be brought about merely by sliding the pedal structure P forward and this may be accomplished without any movement whatsoever in brake plate 15 as the spring 31 maintains the plate 15 in normal position until pressure is applied to the plate 15. This action is clearly shown in Figure 2.

Upon the application of further inward pressure against the pedal structure P the notch 38 of the locking plate 37 is brought into alignment and engagement with the pivot pin 21 to prohibit any movement of the free end 27 of the bell crank lever 25 to insure against acceleration during the braking stage of operation. Generally at the same time, the pivot pins 35 and 36 move the brake plate 15 inwardly disengaging the pin 47 from the back up seats 46 on arms 43. It is in this manner that the brake plate 15 is permitted to swing freely on its axis 16 and in this manner actuate control B or brake control extension 29 when foot pressure is applied.

To operate the brake control extension 29 then, foot pressure is applied first to move the pedal bodily forward to a new and different position than when braking and upon pressing down on the pedal P plate 15 is swung to actuate control B.

The reference numeral 50 indicates generally my novel modified form of combination foot brake and accelerator or foot controlled device as shown in Figures 6–10. This device 50 has a bracket 51 which is adapted to be attached in any suitable manner to a floor board or panel 52 or other supporting structure adjacent the front seat of a vehicle. The instant modified device 50 may if desired be sold as a composite replaceable unit.

At opposite ends of the bracket 51 are provided depending lugs 53 and 54. Swingably carried upon lugs 53 is main brake plate 55 by means of a pin 56 extending therethrough. This brake plate 55 is somewhat of a paddle shaped configuration including neck and head portions 57 and 58 respectively. Disposed on the head portion 58 are two longitudinally spaced slots 59 and 60 respectively (Figure 6). Slot 59 is somewhat of a triangular configuration and has a notch-like seat 61 disposed therein. The slot 59 is defined by edges 61 and 63 which are significant for reasons subsequently developed (Figure 6). Slot 60 is more or less rectangular in shape and is defined by continuous rectangular edge 64 (Figure 6).

Fulcrumed and pivotally carried upon the brake plate 55 is a bell crank lever 65 which is connected at one end to an accelerator control extension or control A, 66 and has another and free end 67 which is disposed in proximity to slot 59. As is shown by the arrow in Figure 6 it will be noted that as the valve or bell crank lever 65 is pivoted upon a pivot pin 68 through plate 15 it causes the extension 66 to move or reciprocate inwardly and outwardly with respect to the bracket 51.

Pivotally connected to the neck portion 57 of the brake plate 55 is a brake control extension or control B, 69 which is movable back and forth as shown by the arrows much in the same manner as is the extension 66 to operate any suitable braking system by applying different forces to a bodily slidable pedal structure P'. It will be appreciated that the instant device is adapted to have two main stages of operation depending on which control A or B is intended to be actuated, that is, either the accelerator extension 66 or the brake extension 69 may be actuated through the application of selective pressures by a foot of an operator to the single pedal P'.

The normal position of the extensions 66 and 69 are shown in Figure 6 when the device 50 or more particularly the pedal P' is free from any foot pressure or the like. Suitable springs 60 and 71 respectively are provided in order to maintain the extensions 66 and 69 in predetermined positions when the pedal P' is free from foot pressure.

The pedal structure P' may be made out of any suitable material although preferably of a substance which enables a good gripping action to be obtained when a foot is applied to the outer surface thereof. This pedal P' also has a heel rest portion 72 to allow a foot to be maintained at all times in firm engagement with the pedal P'.

The pedal structure P' has formed on the underside thereof integral sets of longitudinally spaced lugs 73, 73 and 74, 74. It will be noted that each of the lugs in each set are spaced transversely relative to one another and are adapted to receive therebetween the brake plate 55. Pivot pins 75 and 76 each extend transversely through respective sets of lugs 73, 73 and 74, 74 and in so doing extend through the brake plate slots 59 and 60 to maintain the pedal structure P' in assembly therewith.

Fulcrumed on the brake plate 55 by the same pivot pin 68 is a lock out arm or plate 77 having an accelerator lock out end 78 therein which is in close adjacency to the seat 61 in the slot 59. The lock out plate or arm 77 is connected at one end by a pivot pin 79 to the main plate 55. A lock out connecting arm or extension 80 is connected at one end to the lock out arm 77 and at the other end by a slidable pivot or pin 81 to one of a pair of releasable lever arms or plates 82, 83, and more specifically, the pin 81 is connected to the arm 82. To this end, the arm 82 is provided with an arcuate or curved arm guide or edge 82a. The arm 83 is similar to the arm 43. By virtue of the construction of the arm 82, as the main brake plate 55 swings on its axis or pin 56 the arm 80 may also swing to bring the lock out end 78 into and out of proper alignment and engagement with the pivot pin 75 (Figure 10) when the pin 75 is lodged in the seat 61. The lock out plate 77 is actuated or pivoted on pivot 79 when the heel of the pedal P' is depressed with the motion being transmitted to the plate through the arm edge 82a on the lever arm 82, the pin 81 and the connecting arm 80. It will be appreciated that when the lock out plate 77 is engaged with the pin 75 that the pin 75 is prohibited from actuating bell crank lever 65 and more specifically the free end 67.

Pivotally connected to lug 54 by a pin or fastener 83a are the particularly constructed releasable lever arms 82, 83 each having an arcuate arm portion 84 immediately adjacent the pivot 83a and terminating in an angled terminal portion 85. These arms 82, 83 cooperate with the pedal P' to provide a releasable back up stop means therefor in cooperation with certain other components as will be hereafter further described. Provided at the junction of the arcuate arm portion 84 and terminal portion 85 on the underside thereof is a notch or seat 86 which serves a function hereinafter described in further detail.

Carried on the main brake plate 55 is a pivot pin 87 which is adapted in one stage of the operation of my device 10 to engage in the seats 86 of the arms 83 to provide a backed up stop. When acting as a stop, the pivot pin 76 is engaged against the free ends of terminal arm portions 85 to enable the pedal P' to rotate on pin 76 (as is shown in Figure 6 by the dotted and full lines) to move the forward portion of the pedal up and down to actuate accelerator extension 66.

In the other stage of operation, when the pedal P' is moved bodily upward or forward with the respective pins 75 and 76 moving into forward positions in the respective slots 59 and 60 the pivot pin 87 is caused to disengage from seats 86 (Figure 9). During this stage of operation the pivot pin 76 slidably moves forward along the top edges 88 of portions 84 and 85 of arms 82 and 83 until the pin 76 reaches the forward edge 64 of slot 60. At this time the pressure exerted by the foot against the pedal causes the main brake plate 55 to swing and actuate brake control extension 69 or control B.

In order to aid in maintaining the pedal P' in a neutral position in readiness to either accelerate or brake, a spring 89 is connected at one end to the main plate 55 and at the other end to the pedal P'. When the foot is released from the pedal, the spring will draw the pedal downwardly until the pin 76 is bottomed in the slot 60 on the main plate 55.

Operation

By virtue of employing springs 70, 71 and 89 when the pedal P' is free from pressure the various components of my device 50 will automatically be returned to a predetermined normal position as is indicated by the full line disclosure in Figure 6.

When the device 50 and particularly the pedal P' is in a normal or rearward position it will be noted that the pivot 76 bears against arm portions 85 (Figure 6) of the back up or support levers 82 and 83 and that the pin 87 is seated in seats 88 in backed up relation.

By applying pressure with the toe portion of the foot against the pedal it is caused to pivot and swing from the pivot 86 to actuate extension 66 or control A. As is shown in Figure 6, in dotted lines, the free end 67 of the bell crank lever 65 normally rests closely adjacent or against the pin 75. Thus, when pressure is applied to the forward or upper portion of the pedal it causes the pin 75 to bear against the free end 67 which fulcrums at 68 and causes the accelerator control extension 66 to be actuated. As the pin 75 moves in the slot during acceleration it is guided along slot edge 62.

To brake my device 50 the pedal structure P' must be moved bodily forward on its pivots 75 and 76 in slots 59 and 60 along their respective edges 63 and 64 until pivot 75 is lodged in seat 61 (Figure 7) and at which time pivot 76 is moved into a forward position in slot 60. It should be noted that this entire movement of the pedal structure P' may be brought about merely by sliding the pedal structure P' forward and this may be accomplished without any movement whatsoever in brake plate 55 as the spring 71 maintains the plate 55 in normal position until pressure is applied to the plate 55. This action is clearly shown in Figure 7.

Upon the application of further inward pressure against the pedal structure P' the locking end 78 of the locking arm or plate 77 is brought into alignment and engagement with the pivot pin 75 to prohibit any movement of the free end 67 of the bell crank lever 65 to insure against acceleration during the braking stage of operation. Generally at the same time the pivot pins 75 and 76 move the brake plate 55 inwardly disengaging the pin 87 from the backup seats 86 on arms 82—83. It is in this manner that the brake plate 55 is permitted to swing freely on its axis or pivot 56 into a forward position and in this manner actuate control B or brake control extension 69 when foot pressure is applied.

To operate the brake control extension 69 then, foot pressure is applied first to move the pedal bodily forward to a new and different position than when accelerating and upon pressing down on the pedal P' plate 55 is swung to actuate control B.

In view of the foregoing it will now be perceived how highly efficient combination foot brake and accelerator devices may be constructed and operated having a reduced number of parts and which may be economically manufactured on a large production basis. With my improved structures where one foot pedal may be operated for either accelerating or braking stages, there is no need to move the foot since a single pedal is utilized therefore saving time between acceleration cut-off and braking all to the end of reducing accidents.

It will be understood that modifications and variations may be effected without departing from the scope of the novel concepts of the present invention.

I claim as my invention:

1. A foot controlled device including a foot pedal to selectively actuate accelerator and brake controls, a main braking plate connected to a supporting structure and maintained relatively stationary to said supporting member in a first stage of operation of said foot device when said accelerator control is actuated and swingable relative to said supporting structure in a second stage of operation of said foot device to actuate said brake control, and a swingable bell crank lever fulcrumed on and swingable relative to said foot device cooperable with said accelerator control to actuate same during said first stage of operation of said foot device, said foot pedal being operatively connected to said main plate and bell crank lever to actuate same upon the selective application of forces on said pedal to operate said controls, and lock out means carried on said device to positively prohibit actuation of said accelerator control when a force is being applied to actuate the brake control, said foot pedal being bodily slidable forwardly with respect to said plate during said second stage of operation and having a portion slidable along an edge of said bell crank lever into engagement with said lock out means, said lock out means comprising a pivotally mounted plate having a notch to receive said portion.

2. A foot controlled device including a foot pedal to selectively actuate accelerator and brake controls, a main braking plate connected to a supporting structure and maintained relatively stationary to said supporting member in a first stage of operation of said foot device when said accelerator control is actuated and swingable relative to said supporting structure in a second stage of operation of said foot device to actuate said brake control, and a swingable bell crank lever fulcrumed on and swingable relative to said foot device cooperable with said accelerator control to actuate same during said first stage of operation of said foot device, and lock out means carried on said device to positively prohibit actuation of the accelerator control when a force is being applied to actuate the brake control, said foot pedal being bodily slidable forwardly with respect to said plate during said first stage of operation and having a portion slidable along an edge of said bell crank lever into engagement with said lock out means, said lock out means comprising a pivotally mounted plate having a notch to receive said portion, said lock out means being fulcrumed on said braking plate with said bell crank lever and having a guide arm connected at one end to said supporting structure and at the other end to said lock out means to allow said notch to be brought into alignment and engagement with said portion as said pedal is moved bodily forward during actuation of the accelerator control.

3. A foot controlled device including a foot pedal to selectively actuate accelerator and brake controls, a main braking plate pivotally connected to a supporting structure and maintained relatively stationary to said supporting member in a first stage of operation of said foot device when said accelerator control is actuated and swingable relative to said supporting structure in a second stage of operation of said foot device to actuate said brake control, a swingable bell crank lever fulcrumed on and swingable relative to said main braking plate cooperable with said accelerator control to actuate same during said first stage of operation of said foot device, said foot pedal being operatively connected to said main plate and bell crank lever to actuate same upon the selective application of forces on said pedal to operate said controls, said foot pedal being slidably carried by said main plate into a forward and a rearward position with respect thereto and with the slidable pedal being in the rearward position for operating the accelerator control and with the pedal being in the forward position for operating the braking control, arm structure slidably connected to the main braking plate and with the pedal being slidably engaged on said arm structure, and lockout means pivotally mounted on the main braking plate for preventing operation of the accelerator while operating the braking control, said lock-out means being connected to said arm structure and being operable upon the pivotal movement of the braking plate relative to the supporting structure.

4. A manually controlled foot operated device including a foot pedal structure having upper and lower pedal portions and upper and lower slidable pivots for cooperation with accelerator and brake controls and with the controls being adapted to operate upon the application of selective forces against either of the pedal portions during alternate selective stages of operation of said foot pedal, foot pedal actuable main lever means connectable to a supporting structure and to said foot pedal structure and maintained relatively stationary to said supporting member in one stage of operation of said device when said accelerator control is actuated by said foot pedal structure and swingable relative to said supporting structure in another stage of operation of said device to actuate said brake control, second lever means fulcrumed on said foot device cooperable with said accelerator control when actuated by said foot pedal structure during said one stage of operation of said device, and releasable back up stop means operable during the actuation of the accelerator control to maintain said lower portion of said pedal structure in a fixed position from which said upper portion of said pedal structure may pivot to actuate said second lever means, said releasable back up means including at least one lever arm pivotally connectable at one end to said supporting structure and having a seat thereon, said foot device having means to slide in and out of engagement with said seat from which said lower slidable pivot may be maintained in a fixed position in the operation of the accelerator control and may be released from said fixed position to enable said foot pedal structure to swing said main lever to actuate the brake control.

5. A manually controlled foot operated device including a foot pedal structure having upper and lower pedal portions and upper and lower slidable pivots for cooperation with accelerator and brake controls and with the controls being adapted to operate upon the application of selective forces against either of the pedal portions during alternate selective stages of operation of said foot pedal, a main brake lever connectable to a supporting structure and to said foot pedal structure and maintained relatively stationary to said supporting member in one stage of operation of said device when said accelerator control is actuated by said foot pedal structure and swingable relative to said supporting structure in another stage of operation of said device to actuate said brake control, a swingable lever fulcrumed on said foot device cooperable with said accelerator control when actuated by said foot pedal structure during said one stage of operation of said device, and releasable back up stop means operable during the actuation of the accelerator control to maintain said lower portion of said pedal structure in a fixed position from which said upper portion of said pedal structure may pivot to actuate said swingable lever, said releasable back up means including at least one lever arm pivotally connectable at one end to said supporting structure and having a seat thereon, said foot device having means to slide in and out of engagement with said seat from which said lower slidable pivot may be maintained in a fixed position in the operation of the accelerator control and may be released from said fixed position to enable said foot pedal structure to swing said main lever to actuate the brake control, said upper pivot actuating said swingable lever when said lower pivot is in a fixed position and being locked out against actuating said swingable lever when said releasable back up stop means is out of engagement with said seat.

6. A manually controlled foot operated device including a foot pedal structure having upper and lower pedal portions and upper and lower slidable pivots for cooperation with accelerator and brake controls and with the controls being adapted to operate upon the application of selective forces against either of the pedal portions during alternate selective stages of operation of said foot pedal, a main brake lever connectable to a supporting structure and to said foot pedal structure and maintained relatively stationary to said supporting member in one stage of operation of said device when said accelerator control is actuated by said foot pedal structure and swingable relative to said supporting structure in one another stage of operation of said device to actuate said brake control, a swingable lever fulcrumed on said foot device cooperable with said accelerator control when actuated by said foot pedal structure during said one stage of operation of said device, and releasable back up stop means operable during the actuation of the accelerator control to maintain said lower portion of said pedal structure in a fixed position from which said upper portion of said pedal structure may pivot to actuate said swingable lever, said releasable back up means including at least one lever arm pivotally connectable at one end to said supporting structure and having a seat thereon, said foot device having means to slide in and out of engagement with said seat from which said lower slidable pivot may be maintained in a fixed position in the operation of the accelerator control and may be released from said fixed position to enable said foot pedal structure to swing said main lever to actuate the brake control, said upper pivot actuating said swingable lever when said lower pivot is in a fixed position and being locked out against actuating said swingable lever when said releasable back up stop means is out of engagement with said seat, said brake plate having spaced slots defined by guide edges in which said upper and lower pivots are respectfully slidably engaged during the selective operation of said controls.

7. A foot controlled device including a foot pedal to selectively actuate accelerator and brake controls, a main braking plate pivotally connected to a supporting structure and maintained relatively stationary to said supporting member in a first stage of operation of said foot device when said accelerator control is actuated and swingable relative to said supporting structure in a second stage of operation of said foot device to actuate said brake control, a swingable bell crank lever fulcrumed on and swingable relative to said main braking plate cooperable with said accelerator control to actuate same during said first stage of operation of said foot device, said foot pedal being operatively connected to said main plate and bell crank lever to actuate same upon the selective application of forces on said pedal to operate said controls, said foot pedal being slidably carried by said main plate into a forward and a rearward position with respect thereto and with the slidable pedal being in the rearward position for operating the accelerator control and with the pedal being in the forward position for operating the braking control, arm structure slidably connected to the main braking plate and with the pedal being slidably engaged on said arm structure, and lock out means pivotally mounted on the main braking plate for preventing operation of the accelerator while operating the braking control, the lock out means including a lock out arm pivotally mounted on the main braking plate and having a lock out extension pivotally connected to the arm structure and movable with the arm structure into and out of locking connection with the pedal to prevent operation of the accelerator during the operation of the brake.

8. In a foot controlled device including separate accelerator and brake controls and a supporting structure, a single main braking plate having a pivotal connection between an upper end of the single main braking plate and the supporting structure suspending the single main braking plate from the supporting structure with the single main braking plate being swingable relative to the supporting structure on said pivotal connection, a foot pedal slidably mounted on said single main braking plate to selectively actuate the accelerator and brake controls and with the foot pedal and the single main braking plate being swingable together on said pivotal connection, said foot pedal being slidably carried by said main plate into an upper forward position and a lower rearward position with respect thereto and with the slidable pedal being in the lower rearward position for operating the accelerator control and with the foot pedal being in the upper forward position for operating the brake control, releasable arm structure engaged with a lower end of the single main braking plate and supporting the single main braking plate and the foot pedal in a fixed position when the foot pedal is in its lower rearward position to assist in the operation of the accelerator control, a swingable bell crank lever fulcrumed on and swingable relative to said braking plate between its upper and lower ends and cooperable with the accelerator control to actuate the same when said foot pedal is in its lower rearward position, the single main braking plate being releasable from the fixed position during the operation of the braking control when the foot pedal is moved into its upward forward position, and a lockout mechanism pivotally mounted on the single main braking plate and operable upon movement of the foot pedal into the upper forward position positively preventing actuation of said bell crank lever during the operation of the brake control as a consequence of the main braking plate being released from its fixed position ordinarily secured by the releasable arm structure whereby the single main braking plate and the foot pedal may be pivoted on the pivotal connection.

9. The foot controlled device of claim 8 further characterized by arm structure slidably connected to the main braking plate and with the pedal being slidably engaged on said arm structure, and the lockout mechanism comprising a lockout arm pivotally mounted on the main braking plate and having a lockout extension pivotally connected to the arm structure and movable with the arm structure into an out of locking connection with the pedal to prevent operation of the accelerator during the operation of the brake.

References Cited in the file of this patent

UNITED STATES PATENTS

| | | |
|---|---|---|
| 1,859,708 | Lormuller | May 24, 1932 |
| 2,110,350 | Winters | Mar. 8, 1938 |
| 2,139,010 | Franks | Dec. 6, 1938 |
| 2,411,167 | Perry | Nov. 19, 1946 |

FOREIGN PATENTS

| | | |
|---|---|---|
| 141,725 | Switzerland | Dec. 1, 1930 |